United States Patent
Greminger

(10) Patent No.: US 8,531,799 B2
(45) Date of Patent: Sep. 10, 2013

(54) HEAD GIMBAL ASSEMBLY WITH CONTACT DETECTION

(75) Inventor: Michael Allen Greminger, St. Anthony, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 777 days.

(21) Appl. No.: 12/603,930

(22) Filed: Oct. 22, 2009

(65) Prior Publication Data

US 2011/0096440 A1 Apr. 28, 2011

(51) Int. Cl.
*G11B 5/48* (2006.01)

(52) U.S. Cl.
USPC .......................................... 360/245.3

(58) Field of Classification Search
USPC .................... 360/245.3, 254.6, 255
See application file for complete search history.

(56) References Cited

U.S. PATENT DOCUMENTS

| | | | | |
|---|---|---|---|---|
| 5,142,424 A * | 8/1992 | Hatamura | ................... | 360/244.2 |
| 5,862,015 A * | 1/1999 | Evans et al. | ................ | 360/244.1 |
| 6,181,520 B1 * | 1/2001 | Fukuda | ....................... | 360/244.1 |
| 6,310,746 B1 * | 10/2001 | Hawwa et al. | ............. | 360/97.19 |
| 6,424,498 B1 | 7/2002 | Patterson et al. | | |
| 6,452,753 B1 | 9/2002 | Hiller et al. | | |
| 6,714,386 B1 | 3/2004 | Polycarpou et al. | | |
| 6,798,605 B2 | 9/2004 | Kurita et al. | | |
| 6,967,819 B1 * | 11/2005 | Wolter et al. | .............. | 360/244.1 |
| 7,000,459 B2 * | 2/2006 | Riddering et al. | .............. | 73/105 |
| 7,209,309 B2 | 4/2007 | Kurita et al. | | |
| 7,312,941 B2 * | 12/2007 | Hirano et al. | ................... | 360/31 |
| 7,813,083 B2 * | 10/2010 | Guo et al. | .................. | 360/245.9 |
| 7,821,741 B2 * | 10/2010 | Abustan et al. | ............ | 360/264.1 |
| 8,179,629 B2 * | 5/2012 | McCaslin et al. | .......... | 360/77.03 |
| 2009/0268345 A1 * | 10/2009 | Koganezawa | .............. | 360/234.6 |

FOREIGN PATENT DOCUMENTS

| | | |
|---|---|---|
| JP | 08-007511 | 1/1996 |
| JP | 11-025628 | 1/1999 |
| JP | 2000-251431 | 9/2000 |

* cited by examiner

*Primary Examiner* — Angel Castro
(74) *Attorney, Agent, or Firm* — Hall Estill Attorneys at Law

(57) ABSTRACT

An apparatus and associated method for a head gimbal assembly (HGA) that detects a contact event. Various embodiments of the present invention are generally directed to a load beam coupled to a plate via a gimbal. The plate has a cantilevered ramp limiter which extends forward from the gimbal to engage a ramp load/unload structure. A slider is affixed to a lower surface of the plate opposite the gimbal while a strain gage is affixed to the ramp limiter.

20 Claims, 7 Drawing Sheets

HEAD GIMBAL ASSEMBLY WITH CONTACT DETECTION

BACKGROUND

The ongoing commercialization of digital data processing devices has generally resulted in mass storage capabilities being increasingly incorporated into a number of different types of devices, particularly with hand-held portable devices such as cell phones, digital cameras, personal data assistants (PDAs), etc. A disc drive is a type of mass storage device that generally stores data on one or more rotatable magnetic recording discs.

In operation, a corresponding array of data transducers is selectively moved across the surfaces of the discs to transduce data therewith. During periods of device use and non-use, portions of the head gimbal assembly (HGA) that includes the data transducers can inadvertently come into contact with the recording discs and cause damage that can lead to direct data loss and secondary reliability problems due to generated debris.

As portions of the HGA come into contact with a recording disc, any exposed edges can cause plastic deformation of both the HGA and the disc. However, such contact event is often undetectable due to low contact magnitude or no induced off-track motion.

As such, there is a continued need to improve contact detection regardless of magnitude or resulting motion. Therefore, it is desirable to detect any contact of an HGA, particularly with regard to contact events with small resultant deviations.

SUMMARY OF THE INVENTION

Various embodiments of the present invention are generally directed to a head gimbal assembly (HGA) capable of detecting various contact events. In accordance with various embodiments, a load beam is coupled to a plate via a gimbal. The plate has a cantilevered ramp limiter which extends forward from the gimbal to engage a ramp load/unload structure. A slider is affixed to a lower surface of the plate opposite the gimbal while a strain gage is affixed to the ramp limiter. These and other features and advantages which characterize the various embodiments of the present invention can be understood in view of the following detailed discussion and the accompanying drawings.

BRIEF DESCRIPTION OF THE DRAWINGS

FIG. 7B shows and isometric view of relevant portions of the ramp limiter of

FIG. 7A constructed in accordance with various embodiments of the present invention.

DETAILED DESCRIPTION

The present disclosure generally relates to the reading and writing of data to a memory space, and in particular to methods and architecture that may be used to improve the detection of a contact event for a head gimbal assembly (HGA). Problems often experienced in mobile and consumer electronics data storage devices are specific failure modes related to head-media contact. Such contact can be undetectable if the resultant motion of the HGA contact is too small or does not induce the HGA off course. Moreover, various contact events can be undetectable under prior art algorithms despite significant impact if the HGA contacts with zero degrees of head skew.

Accordingly, an HGA that has a strain gage affixed to a cantilevered ramp limiter which is part of a plate and extends forward from a gimbal to engage a ramp load/unload structure can detect contact by identifying vibration and deflection of the ramp limiter. As such, the strain gage is affixed to a lower surface of the ramp limiter while a slider is affixed to a lower surface of the plate which is coupled to a distal end of a cantilevered load beam. As a result, any contact event of the HGA can be accurately and quickly detected due to the strain gage being positioned in such close proximity to the slider.

Figure 1:
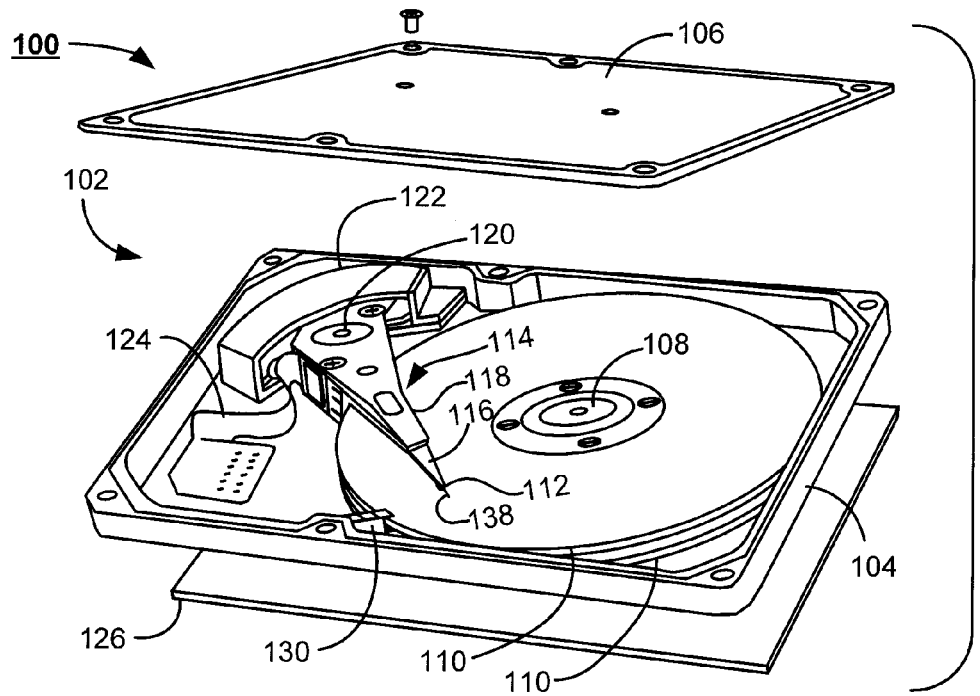
FIG. 1 is a perspective view of a disc drive block data storage device constructed and operated in accordance with preferred embodiments of the present invention.

Turning to the drawings, FIG. 1 provides a top perspective view of a disc drive block data storage device 100. The drive 100 is provided to show an exemplary environment in which various embodiments of the present invention can be advantageously practiced. It will be understood, however, that the claimed invention is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers that are each supported by a head gimbal assembly (HGA) 112. While FIG. 1 shows the use of two magnetic recording discs and four corresponding heads, other numbers of heads and discs (such as a single disc, etc.) and other types of media (such as optical media, etc.) can alternatively be utilized as desired.

Each HGA 112 is preferably supported by a head-stack assembly 114 ("actuator") that includes a flexible suspension 116, which in turn is supported by a rigid actuator arm 118. The actuator 114 preferably pivots about a cartridge bearing assembly 120 through application of current to a voice coil motor (VCM) 122. In this way, controlled operation of the VCM 122 causes the transducers of the HGA 112 to align with tracks (not shown) defined on the media surfaces to store data thereto or retrieve data therefrom.

FIG. 1 further shows a flex circuit assembly 124 that facilitates electrical communication between the actuator 114 and device control electronics on an externally disposed device printed circuit board (PCB) 126. When the device 100 is not in use, the HGAs 112 are preferably moved (unloaded) to a ramp structure 130 located near an outermost periphery of the media. The ramp structure 130 serves to provide respective surfaces on which the transducers 112 can safely be disposed while the media 110 are in a non-rotational state.

When device I/O operation is desired, the spindle motor 108 accelerates the media 110 to a substantially constant velocity sufficient to support the HGAs 112 and a predetermined operational fly height above the storage media 110. Subsequently, the HGAs 112 are moved (loaded) from the ramp structure 124 to the media 110. It has been observed that when the HGAs 112 are loaded, portions can drop a distance greater than the operational fly height above the media 110 and come into contact with the media 110, as generally presented in FIG. 2.

Figure 2:
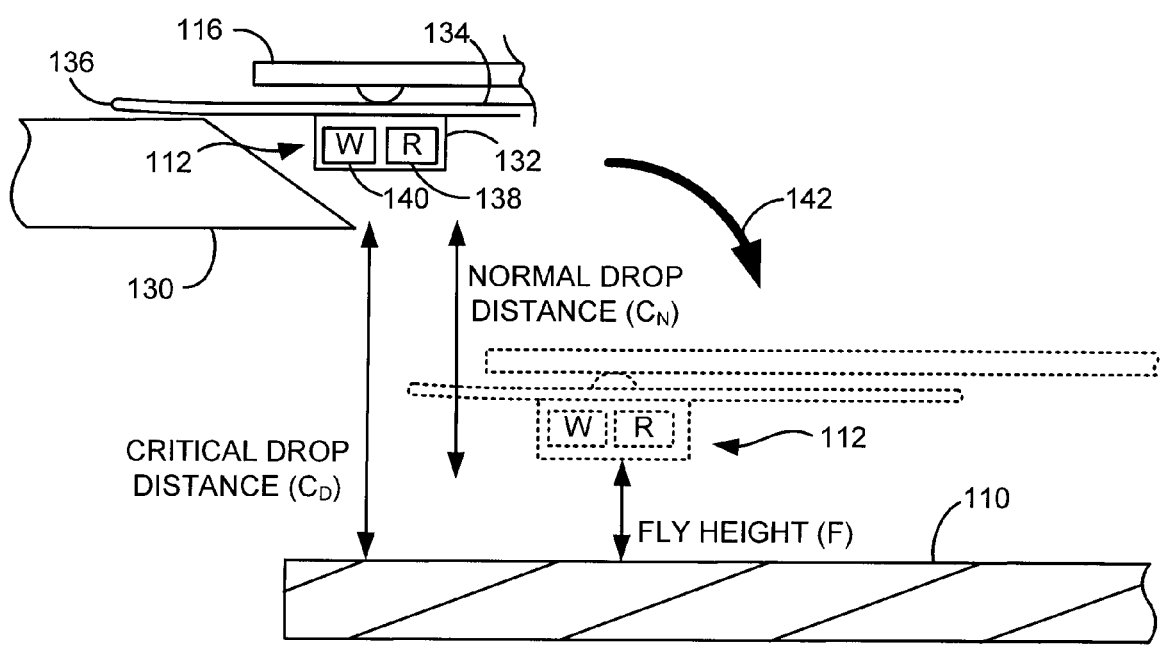
FIG. 2 shows an exemplary operation of relevant portions of the data storage device of FIG. 1.

FIG. 2 provides a side view representation of the interaction of a selected HGA 112 with the surface of an associated media 110. For reference, FIG. 2 is an operational view of the HGA 112 being loaded from the ramp structure 130 shown in FIG. 1. Here, the storage media 110 can be seen below the HGA 112, although it will be understood that such is not limiting.

As shown, the HGA 112 is gimbaled near a distal end of the flexible suspension 116, and includes a slider structure 132 affixed to a plate 134 while a ramp limiter 136 extends forward from the gimbal. As shown, the HGA 112 is configured to hydrodynamically interact with a flow of fluidic currents established by high speed rotation of the media 110. In an unloaded state, the HGA 112 is positioned on the ramp structure 130 so that the transducers 138 and 140 do not reside over any portion of the media 110.

As shown by arrow 142, when the HGA 112 is loaded, the slider 132 and transducers 138 and 140 drop to the operational fly height F adjacent to the media 110. As will be recognized, the suspension 116 provides a bias force upon the HGA 112 which is countered by the air bearing force induced by fluidic interaction of the moving air adjacent the media surface, resulting in stable flight of the slider 132 at the fly height F. In some embodiments, the distance of the transducer head 112 from the storage media 110 in an operating state will be on the order of a few tenths of a micron or less (μm, or $1 \times 10^{-6}$ meters).

It can be appreciated that the fly height of the HGA 112 can vary during operation, but the operational fly height as used herein is a predetermined distance above the media 110 which data operations are desirably conducted. While a normal drop distance ($C_N$) is desired and allows the HGA 112 to undergo operation upon reaching the operational fly height F, the HGA 112 can inadvertently drop a critical drop distance ($C_D$) in which portions of the HGA 112 contact the media 110. Such contact can result in plastic deformation in which both the media 110 and HGA 112 can be permanently deformed. In severe cases, the plastic deformation causes the loss of data at the point of impact and produces debris that can interfere with transducer operation.

It has further been observed that while the HGA 112 is in the loaded and operational state adjacent the media 110, any sudden motion (shock) can induce contact between portions of the HGA 112 and the media 110. Such operational shock can be as equally damaging as loading contact and result in similar reliability issues with permanent deformation of the media 110 and HGA 112. It should be noted that while various other situations can result in contact between the HGA 112 and the media 110, contact is often difficult to prevent due to the wide variety of environments and uses in modern data storage devices.

Figure 3:
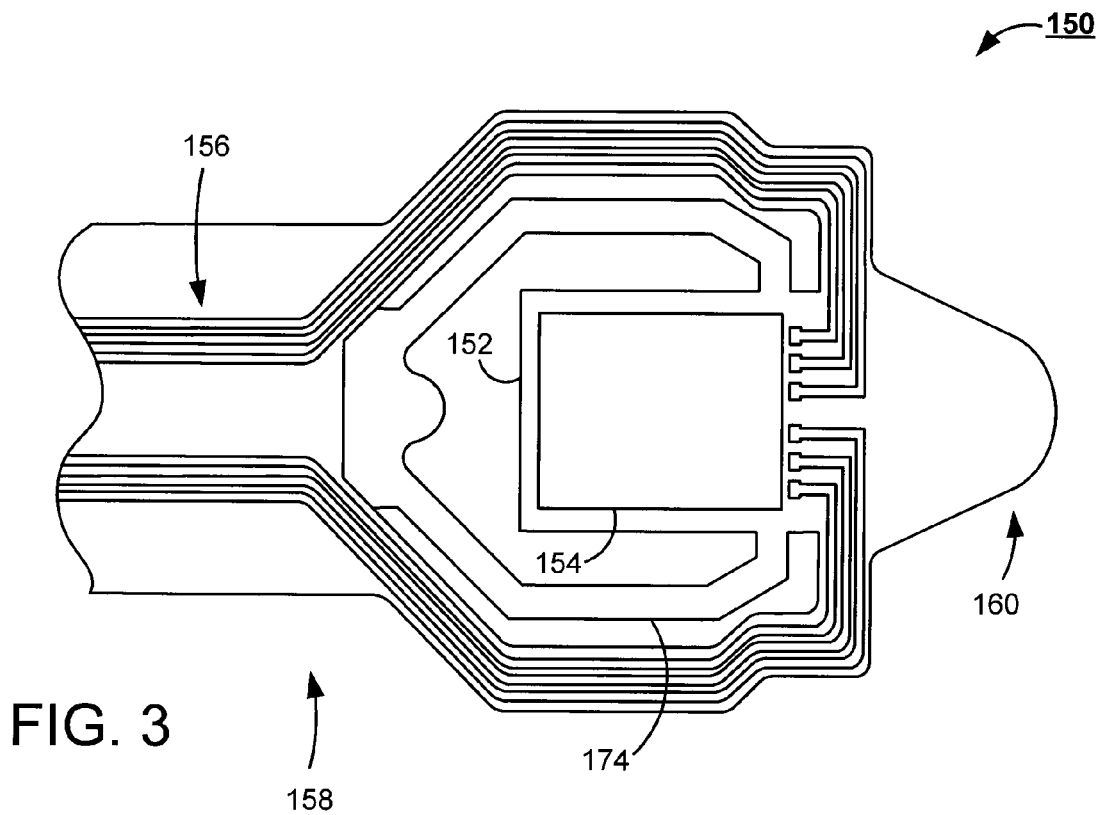
FIG. 3 generally illustrates a ramp limiter structure.

Referring now to FIG. 3, an exemplary gimbal 150 is shown in accordance with various embodiments of the present invention. The gimbal 150 has a gimbal body 152 with a support layer 153 that is configured to support to a slider 154 and provide predetermined hydrodynamic characteristics during operation. For example, the slider can be affixed to a cantilevered portion of the gimbal body 152 so that hydrodynamic forces can thoroughly and freely act on the slider. The gimbal body 152 can include one or more electrical leads 156 that are electrically connected to the slider 154. As shown, each electrical leads 156 can be routed around the cantilevered portion of the body 152 to significantly surround the slider 154 while only contacting the slider 154 at a single electrical connection.

In some embodiments, the portion of the gimbal 150 connected to the slider 154 is characterized as a plate structure 158 while a portion forward of the slider is characterized as a ramp limiter 160. It should be noted that the size, orientation, and configuration of the gimbal 150 is not required or limited and can be modified, as desired. For example, the ramp limiter portion 160 can be a separate component from the plate portion 158.

Figure 4A:
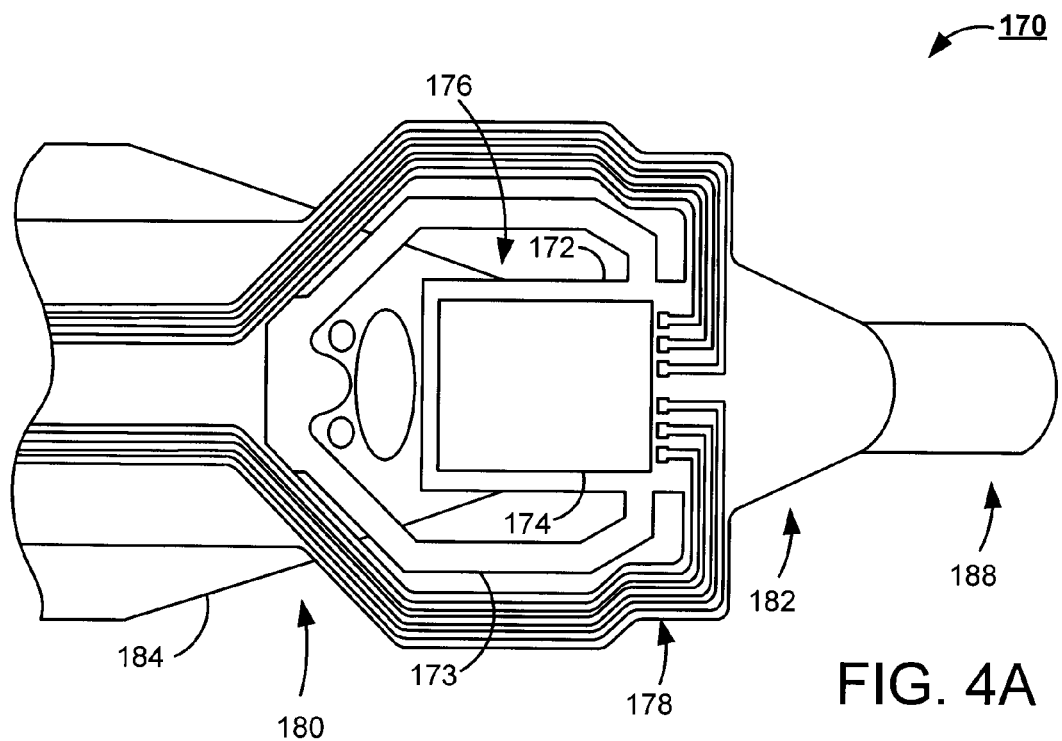
FIGS. 4A-4B show exemplary top and side views of an exemplary head gimbal assembly (HGA) in accordance with various embodiments of the present invention.
Figure 4B:
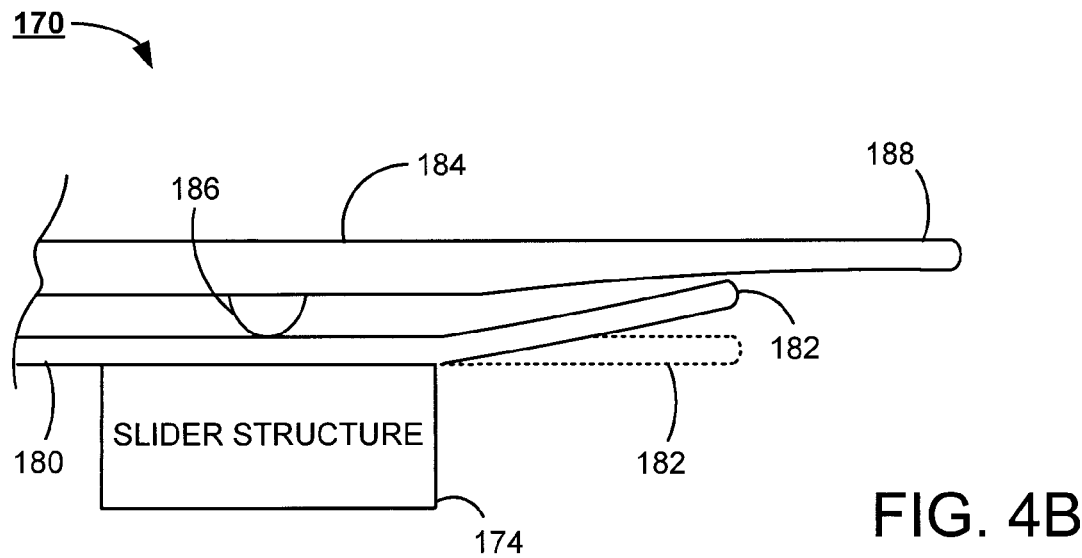

FIGS. 4A-4B generally illustrate an exemplary gimbal 170 constructed and operated in accordance with various embodiments of the present invention. A gimbal body 172 with a support layer 173, as shown in FIG. 4A, is attached to a slider structure 174 on a cantilevered peninsula 176. The slider structure 174 is connected to a plurality of electrical leads 178 that are embedded into the gimbal body 172 and routed around the cantilevered peninsula 176. The portion of the gimbal body 172 that includes the cantilevered peninsula 176 and the slider structure 174 can be characterized as a plate 180 Meanwhile, the cantilevered portion of the gimbal body 172 located forward of the slider structure 174 can be characterized as a ramp limiter 182.

The HGA body 172 is configured, in some embodiments, to hydrodynamically interact with a rotating recordable storage media. Such interaction can be facilitated with a dimpled connection 186 between the gimbal body 172 and a load beam 184, as displayed in FIG. 4B. In various embodiments, the load beam 184 has a cantilevered lift tab 188 that extends forward from the gimbal body 172. The lift tab 188 and the ramp limiter 182 can be configured so that the ramp limiter 182 can deflect without contacting any portion of the load beam 184 or lift tab 188.

FIG. 4B displays the deflection of the ramp limiter as a result of a contact event. While the contact event is not limited to a certain type or magnitude, the ramp limiter 182 can vibrate and deflect in response to contact from any portion of the HGA 170 including, but not limited to, the plate 180, ramp limiter 182, slider structure 174, and load beam 184. It can be appreciated that the deflection shown in FIG. 4B is exaggerated for illustration and is not a required or limited movement of the ramp limiter 182. It should further be noted that the lift tab 188 and ramp limiter 182 components can be separate members from the load beam 184 and plate 180, respectively.

Figure 5:
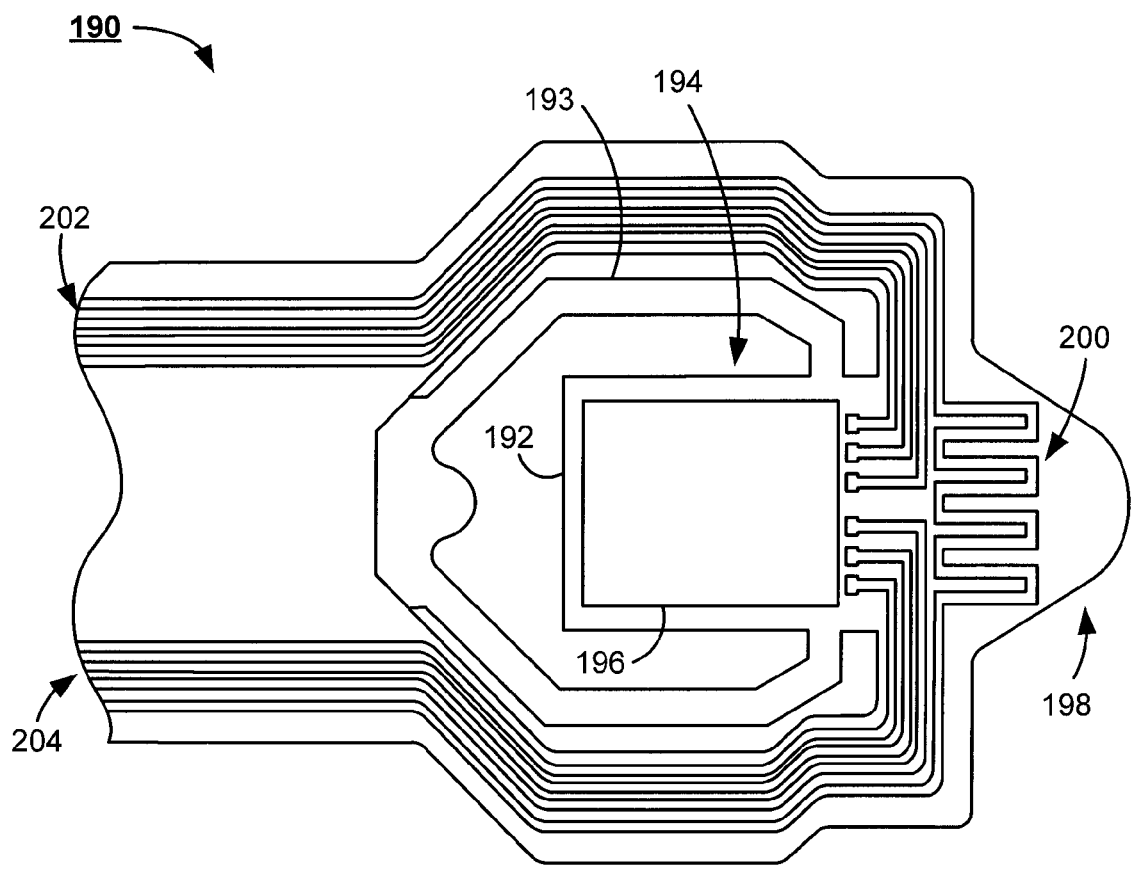
FIG. 5 displays an exemplary ramp limiter constructed and operated in accordance with various embodiments of the present invention.

FIG. 5 displays an exemplary gimbal 190 as constructed and operated in accordance with various embodiments of the present invention. The gimbal 190 has a gimbal body 192 with a support layer 193 that is configured to include a cantilevered peninsula 194 to which a slider structure 196 is affixed. The gimbal body 192 can have a ramp limiter 198 that vibrates and deflects in response to a contact event for the gimbal 190. A strain gage 200 can be affixed to the ramp limiter 198 so that any vibration and deflection is detected. As shown, the strain gage 200 can be connected to one or more electrical traces 202 that are embedded in the gimbal body 192 and routed adjacent the electrical leads 204 connected to the slider structure 204.

In some embodiments, the strain gage 200 is embedded in the ramp limiter 198 and covered with a polymer material. The strain gage 200 can be positioned, in other embodiments, on the ramp limiter 198 so that the strain gage 200 contactingly engages a ramp structure (as shown in FIG. 1) when the gimbal 190 is in a loaded position. The placement of the strain gage 200 on the ramp limiter 108 can advantageously provide precise identification of any contact event, regardless of magnitude or the orientation of the gimbal. However, such strain gage 200 placement can also sense windage excitations of the gimbal 190 as well as ramp load/unload status.

Figure 6:
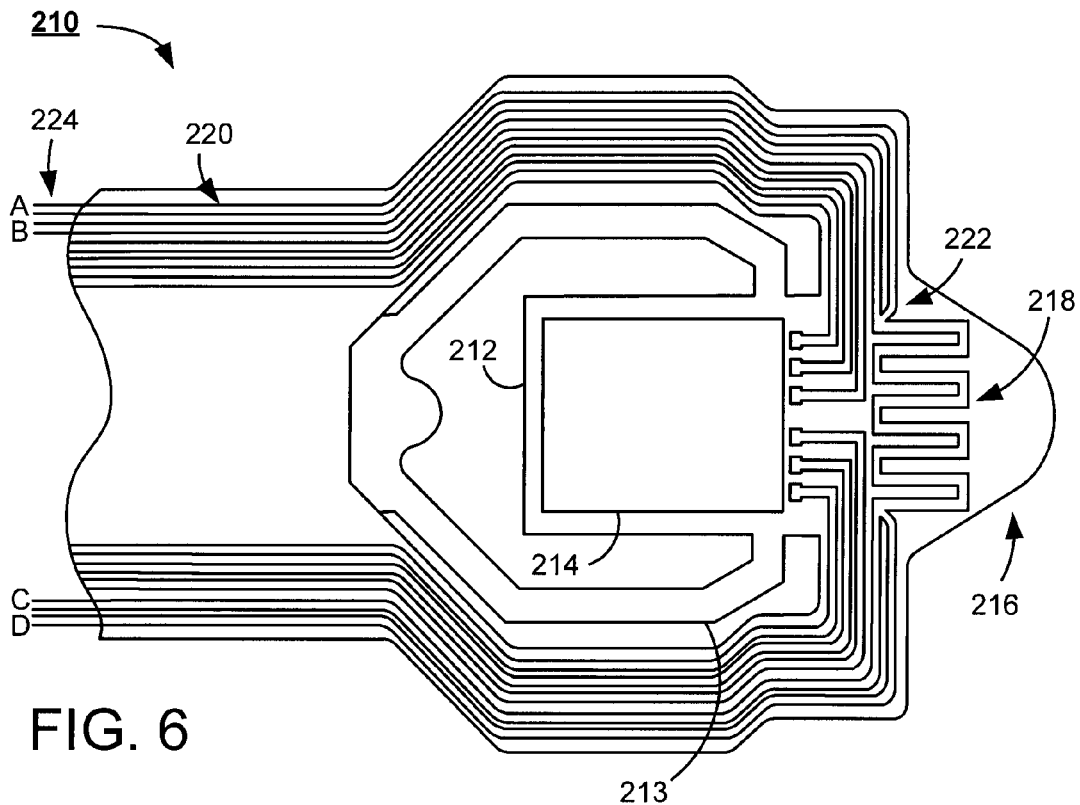
FIG. 6 displays an exemplary ramp limiter constructed and operated in accordance with various embodiments of the present invention.

FIG. 6 shows an exemplary gimbal 210 in accordance with various embodiments of the present invention. As displayed, a gimbal body 212 with a support layer 213 supports a slider structure 214 and a cantilevered ramp limiter 216. The cantilevered ramp limiter 216 has a resistance strain gage 218 affixed thereto. It has been observed that the resistance strain gage 218 can be affected by the electrical resistance associated with the electrical traces 220. That is, the length of the electrical traces 220 can alter measured signals from the resistance strain gage 218.

Accordingly, the electrical resistance of the electrical traces can be compensated by configuring a parallel trace connection 222 on both sides of the strain gage 218. The parallel trace connection 222 can be controlled by a plurality of terminals 224 (A, B, C, and D) in order to compensate for the electrical resistance of the electrical traces. In some embodiments, a terminal 224 connected to each side of the strain gage 218 (i.e. A and C) are matched to receive the same voltage while the remaining terminals on each side of the strain gage 218 (i.e. B and D) compliment each other to eliminate the electrical resistance of the electrical traces 220.

In operation, temperature can influence the resistance of the electrical traces 220 which can be compensated with the configuration shown in FIG. 6. Further in various embodiments, the resistance of the electrical traces 220 can be compensated by having a plurality of electrical traces on one side of the strain gage 218 while having a single electrical trace on the opposite side of the strain gage 218. However, the number of terminals, electrical traces, and compensation configurations are not limited.

Figure 7A:
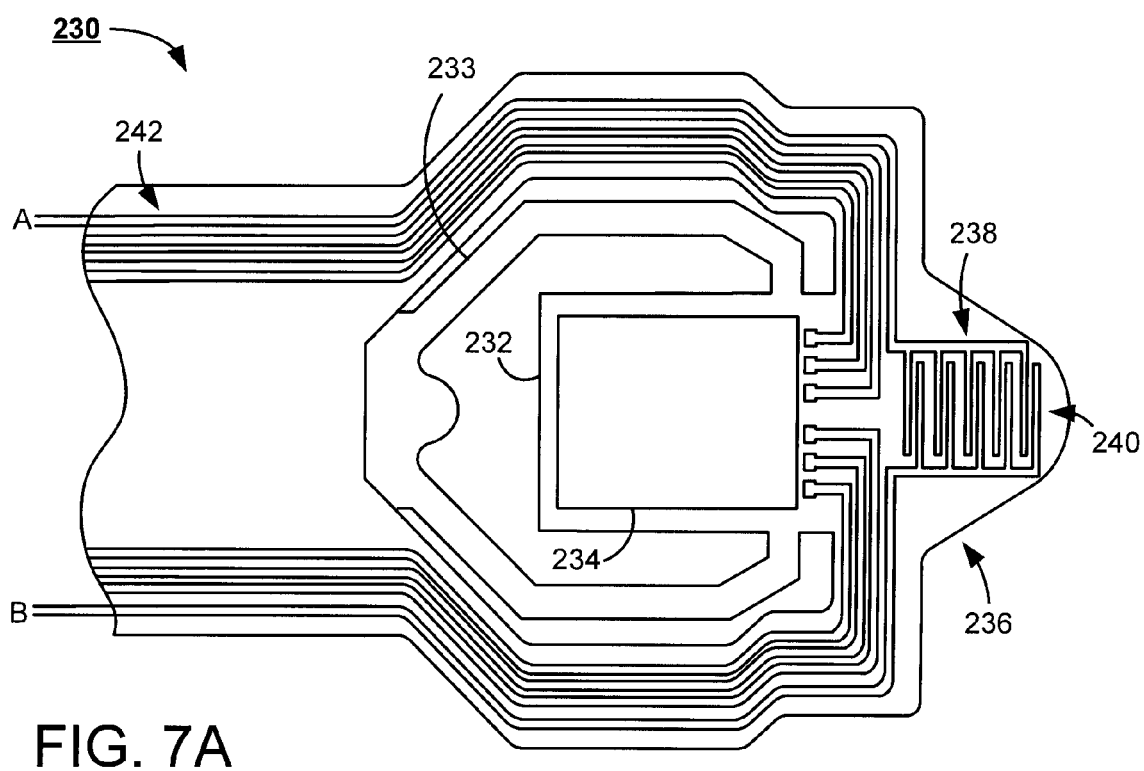
FIG. 7A illustrates an exemplary ramp limiter constructed and operated in accordance with various embodiments of the present invention.
Figure 7B:
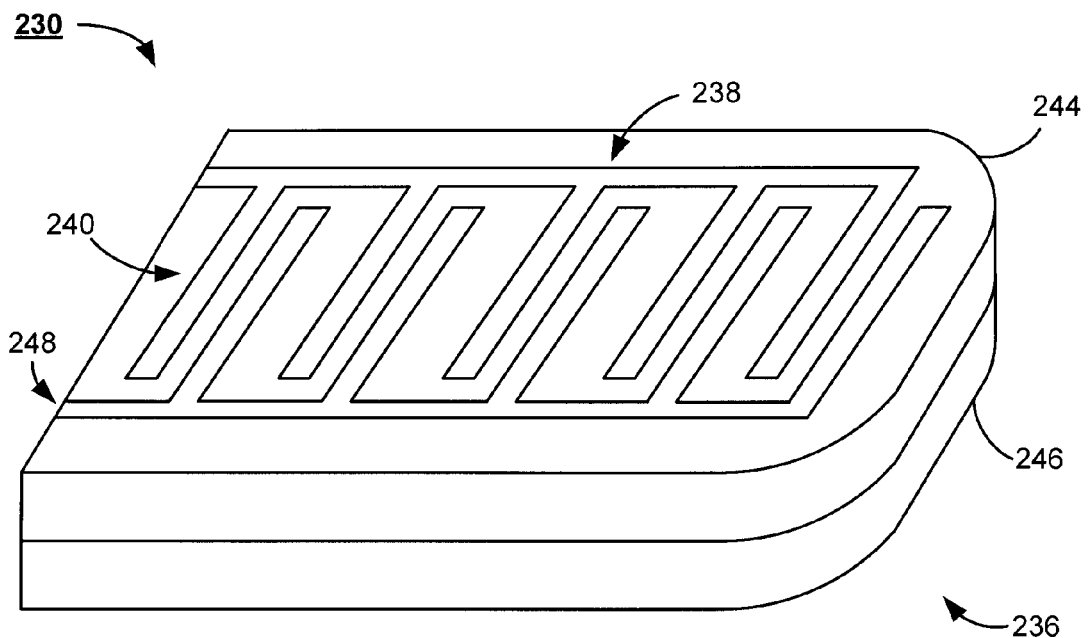

FIGS. 7A and 7B generally provide an exemplary gimbal 230 in accordance with various embodiments of the present invention. FIG. 7A displays a gimbal body 232 with a support layer 233 to which a slider structure 234 is affixed. The gimbal body 232 further includes a ramp limiter 236 to which a capacitive strain gage 238 is affixed. The capacitive strain gage 238 has a plurality of interdigitated fingers 240 that are oriented in close proximity and connected to opposite sides of the capacitive strain gage 238, as shown in FIG. 7B. In some embodiments, the gaps between the interdigitated fingers are not symmetric. That is, one set of gaps is small and the other is large, as displayed in FIG. 7A. As such, the capacitance change of the strain gage 238 is large enough to register precise movements of the gimbal 230. The capacitive strain gage 238 is further configured with electrical traces 242 that are embedded in the HGA body 232 and routed adjacent to the electrical leads connected to the slider structure 234.

FIG. 7B further displays an isometric view of the HGA 230, specifically the capacitive strain gage 238. The interdigitated fingers 240 are shown embedded in the ramp limiter 236. In various embodiments, the ramp limiter is configured with a polymer layer 244 that is supported by a metal layer 246. While the capacitive strain gage 238 is shown with a plurality of terminals 248 in the polymer layer 244, such construction is not required or limited. For example, the metal layer 246 can be utilized as a terminal and electrical route to the capacitive strain gage 238.

Figure 8A:
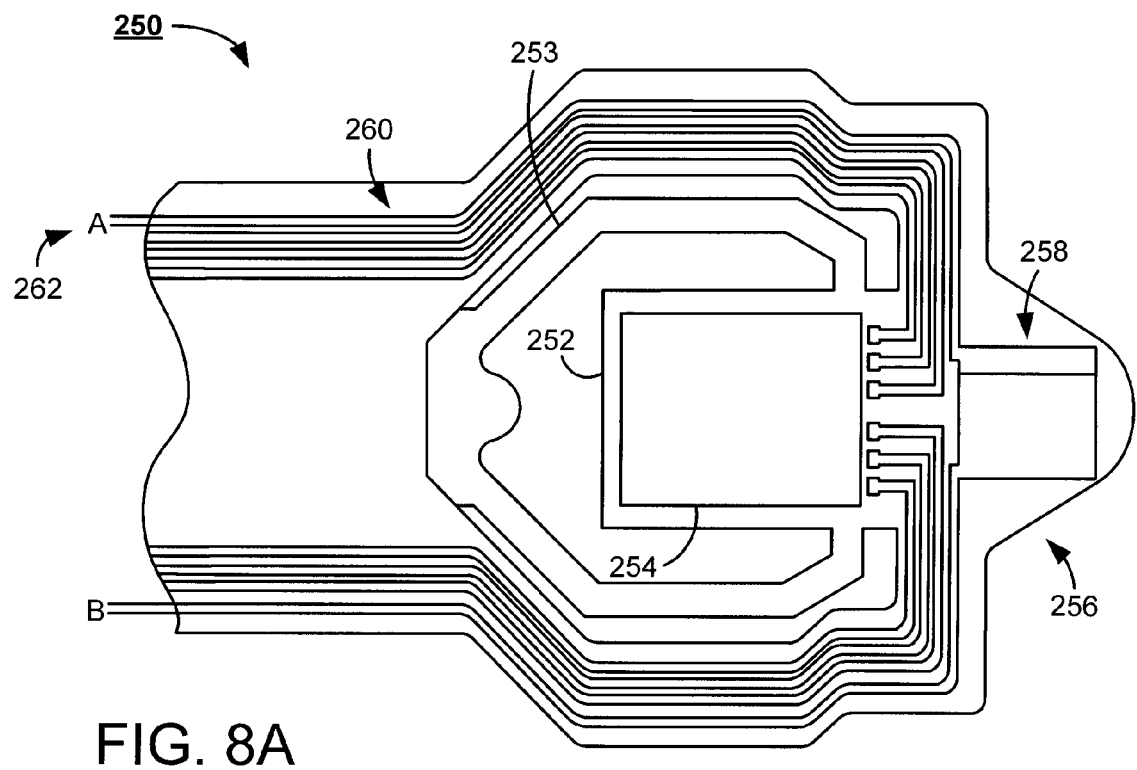
FIG. 8A display an exemplary ramp limiter constructed and operated in accordance with various embodiments of the present invention.
Figure 8B:
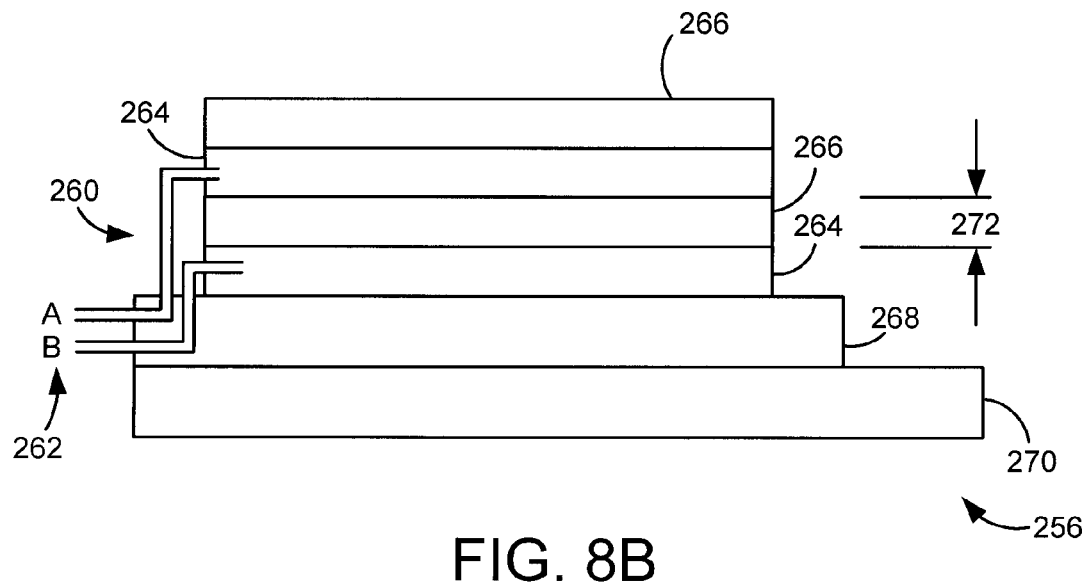
FIGS. 8B-8C further illustrate functional side views of configurations of the ramp limiter of FIG. 8A.
Figure 8C:
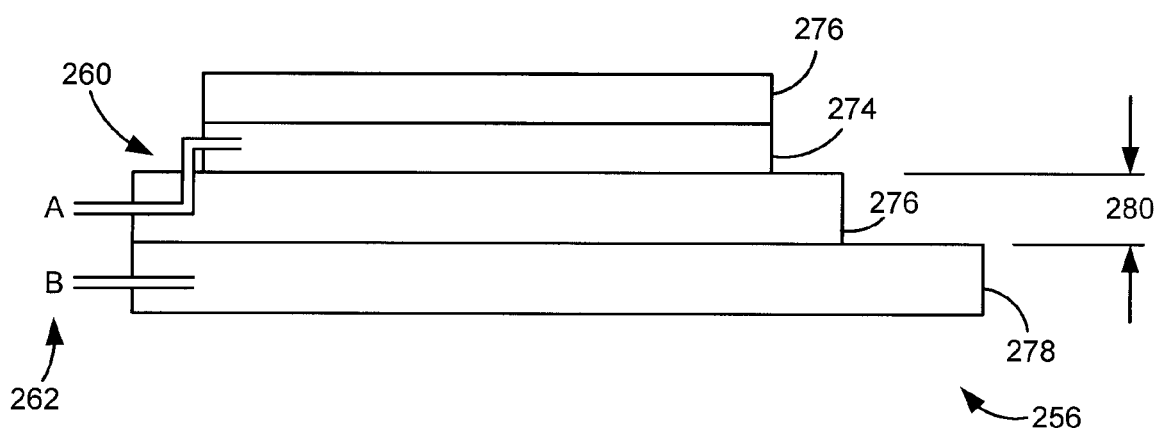

FIGS. 8A-8C generally illustrate an exemplary HGA 250 constructed and operated in accordance with various embodiments of the present invention. The HGA has a body 252 that is affixed to a slider structure 254. FIG. 8A displays the HGA 250 having a ramp limiter 256 extending forward of the slider structure 254 to which a plate strain gage 258 is mounted. The plate strain gage 258 is shown with a plurality of plates that are each electrically connected to terminals 260 by an electrical trace 262 routed around the slider structure 254 without contacting the slider structure 254.

FIG. 8B further provides a representative side view of the plate strain gage 258. As shown, a plurality of parallel plates 264 is disposed about a plurality of insulating layers 266. In various embodiments, the parallel plates are copper metal and the insulating layers are polymide material that are connected to the terminals 262 by electrical traces 260 in order to monitor the capacitance between the parallel plates 264 and consequentially the vibration and deflection of the ramp limiter 256. Further in some embodiments, the ramp limiter 256 is comprised of a polymer layer 268 and a metal layer 270 that support the plate strain gage 258 and allow the electrical traces 260 to be routed.

As the ramp limiter 256 deflects, the gap 272 will change due to Poisson's effect. That is, the deflection will be detectable because when a sample cube of a material is stretched in one direction, it tends to contract (or occasionally, expand) in the other two directions perpendicular to the direction of stretch. As such, the parallel plates 264 and insulating layers 266 will respond to deflection of the ramp limiter 256 in a predictable manner that can be electrically monitored in the configuration shown in FIG. 8B.

However, FIG. 8C displays that the strain gage 256 can be configured with a single plate that can provide similar capacitive strain gage measurements. The single plate 274 can be disposed between insulating layers 276 and provide a capacitance measurement in association with the metal layer 278 component of the ramp limiter 256. The single plate 274 can, in some embodiments, be constructed of copper while the metal layer is a stainless steel. By monitoring the single plate 274 and metal layer 278 through terminals 262 and electrical traces 260, a capacitance corresponding to the gap 280 indicates if any vibration or deflection of the ramp limiter 256 has occurred.

It should be noted that the various constructions of capacitance strain gages shown in FIGS. 8A-8C are not limited and can be configured in any number of orientations that monitor and detect motion of the ramp limiter.

Figure 9:
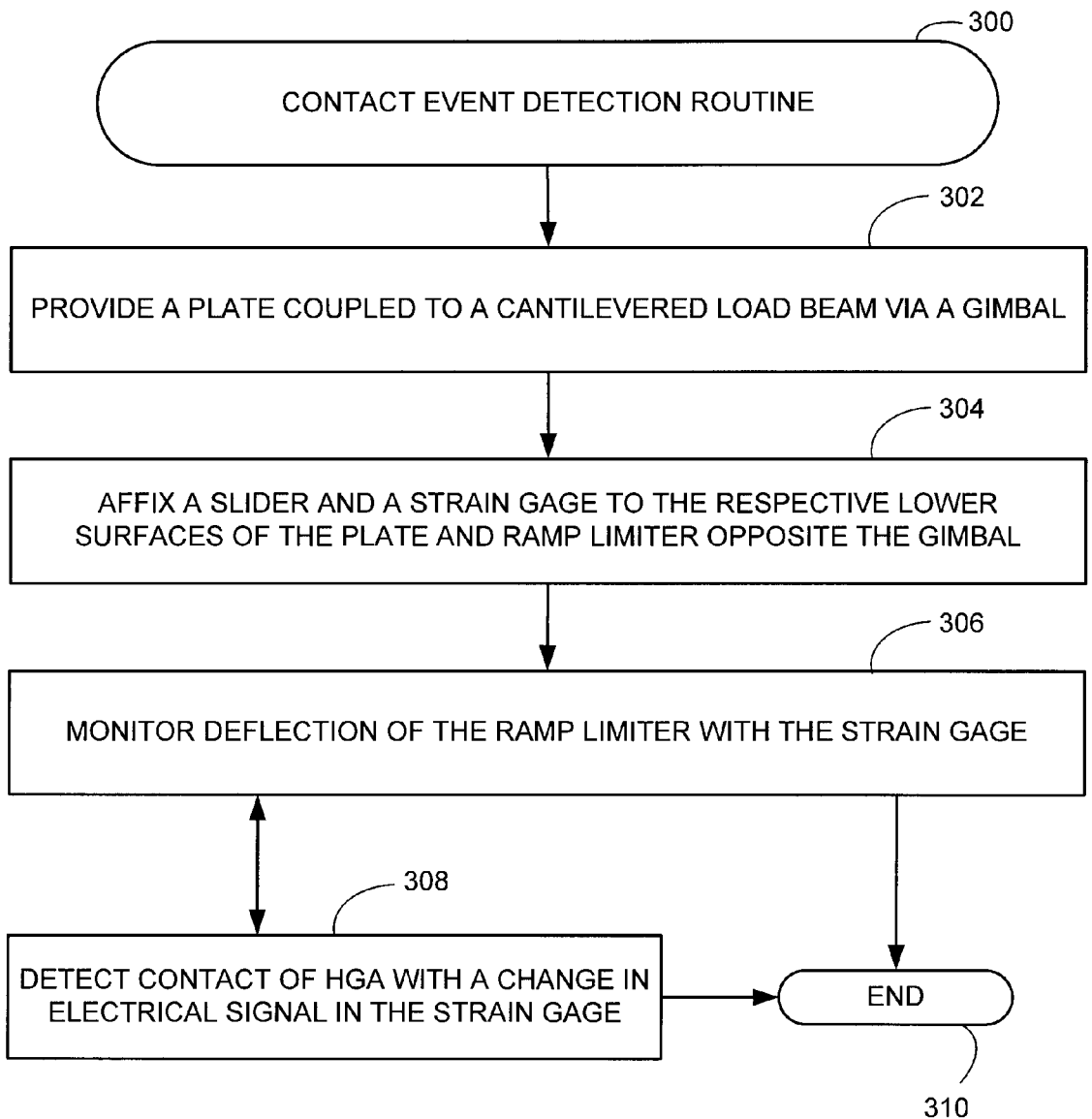
FIG. 9 provides a flowchart of an exemplary contact event detection routine carried out in accordance with various embodiments of the present invention.

FIG. 9 provides an exemplary contact event detection routine 300 conducted in accordance with various embodiments of the present invention. The routine 300 initially provides an HGA with a plate that is coupled to a cantilevered load beam via a gimbal connection in step 302. A slider and strain gage are then affixed to the respective lower surfaces of the plate and ramp limiter opposite the gimbal in step 304. In such embodiments, the slider and strain gage would face a recordable storage media during operation.

In step 306, the ramp limiter is monitored for deflection with the strain gage. The strain gage can be configured as a resistive or capacitive strain gage in various embodiments of the present invention. Further, a controller can be configured to monitor the electrical measurements of the strain gage and identify any contact event that occurs to the HGA. As such a contact event occurs, the strain gage detects the event with a change in electrical signal (i.e. resistance or capacitance) in step 308.

While the routine 300 can return to step 306 and continue to monitor for deflection of the ramp limiter, the routine 300 can alternatively end at step 310 without further contact detection. It should be noted that the various steps in the routine 300 are not required or limited. That is, the various steps can be elaborated, deleted, or moved without deterring from the spirit of the present invention. For example, no contact event could occur and step 308 could be deleted.

It can be appreciated that the material and geometrical characteristics of the HGA described in the present disclosure allows for advantageous detection of contact events. Moreover, the various embodiments discussed herein can provide an improved detection of small magnitude contact events as well as detection regardless of HGA orientation including skew angle. In addition, while the embodiments have been directed to contact detection in a data storage device, it will be appreciated that the claimed invention can readily be utilized in any number of other applications, including non-data storage device applications.

It should be noted that the term "cantilever" is meant to mean a component that is attached and supported only on one end. That is, a distal end of a cantilevered member freely moves and deflects in relation to an attachment point at a proximal end of the member. For example, the cantilevered ramp limiter is attached all along a end proximal to the plate while the distal end of the ramp limiter is suspended and supported only by the attachment to the plate.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A head gimbal assembly (HGA) comprising:
   a load beam;
   a plate coupled to a distal end of the cantilevered load beam via a gimbal, wherein the plate comprises a cantilevered ramp limiter which extends forward from the gimbal to engage a ramp load/unload structure;
   a slider affixed to a lower surface of the plate opposite the gimbal; and
   a strain gage affixed to the ramp limiter.

2. The apparatus of claim 1, wherein the strain gage is embedded in a lower surface of the ramp limiter and covered with a polymer material.

3. The apparatus of claim 2, wherein the strain gage is contactingly adjacent to the ramp load/unload structure when the ramp limiter is in an unloaded position.

4. The apparatus of claim 1, wherein the strain gage detects and monitors deflection of the ramp limiter.

5. The apparatus of claim 1, wherein the strain gage is affixed to a distal end of the ramp limiter opposite a lift tab.

6. The apparatus of claim 1, wherein the slider is affixed on a cantilevered peninsula of the plate.

7. The apparatus of claim 1, wherein a plurality of electrical traces connected to the strain gage substantially surround the slider without being connected to any portion of the slider.

8. The apparatus of claim 7, wherein the electrical traces are configured to compensate for resistance of the electrical leads.

9. The apparatus of claim 7, wherein a single electrical trace is connected to a first side of the strain gage while a plurality of electrical traces are connected to a second side of the strain gage.

10. The apparatus of claim 7, wherein a first plurality of electrical traces are connected to a first side of the strain gage while a second plurality of electrical traces are connected to a second side of the strain gage.

11. The apparatus of claim 1, wherein the strain gage is a resistive strain gage.

12. The apparatus of claim 1, wherein the strain gage is a capacitive strain gage.

13. The apparatus of claim 1, wherein a plurality of interdigitated fingers are presented by both a first side and a second side of the strain gage without the fingers being electrically connected.

14. The apparatus of claim 1, wherein the strain gage comprises a plurality of metal plates each separated by at least one insulator layer.

15. The apparatus of claim 1, wherein the strain gage comprises a single copper plate separated from a metal layer of the ramp limiter by an insulator layer.

16. A method comprising;
    providing a plate coupled to a distal end of a load beam via a gimbal, wherein the plate comprises a cantilevered ramp limiter which extends forward from the gimbal to engage a ramp load/unload structure;
    affixing a slider and a strain gage to the respective lower surfaces of the plate and ramp limiter opposite the gimbal; and
    monitoring deflection of the ramp limiter with the strain gage.

17. The method of claim 16, wherein the ramp limiter deflects due to a contact with a recordable storage media.

18. The method of claim 16, wherein the ramp limiter engages the load/unload structure with a region that contains the strain gage.

19. The method of claim 16, wherein electrical traces connected to the strain gage are routed adjacent to electrical leads that provide electrical connections to the slider.

20. The method of claim 16, wherein the ramp limiter deflection occurs independent of HGA skew angle.

* * * * *